United States Patent [19]

Wolter et al.

[11] Patent Number: 4,631,731
[45] Date of Patent: Dec. 23, 1986

[54] DEVICE FOR PRODUCING OR AMPLIFYING COHERENT RADIATION

[75] Inventors: Joachim H. Wolter; Robert E. Horstman, both of Eindhoven, Netherlands

[73] Assignee: U.S. Philips Corporation, New York, N.Y.

[21] Appl. No.: 576,974

[22] Filed: Feb. 3, 1984

[30] Foreign Application Priority Data

Feb. 21, 1983 [NL] Netherlands .................. 8300631

[51] Int. Cl.⁴ ............................................ H01S 3/09
[52] U.S. Cl. ...................................... 372/74; 372/43
[58] Field of Search ................ 372/43, 74, 44; 357/30

[56] References Cited

U.S. PATENT DOCUMENTS 3,942,132  3/1976  Zinn ..................................... 372/74

OTHER PUBLICATIONS

Bogdan Kevich et al., "Electron-Beam-Pumped Ze-Se-ZnS Hetero Laser", Mar. 3, 1976, *Soviet Journal Quant-Electron*, vol. 6, No. 3, pp. 329-331.
Hurwitz. "Efficient Visible Lasers of $CdS_xSe_{1-x}$ By Electron-Beam Excitation", May 15, 1966, Applied Physics Letter, vol. 8, No. 10, pp. 243-245.

*Primary Examiner*—James W. Davie
*Assistant Examiner*—Georgia Y. Epps
*Attorney, Agent, or Firm*—Robert T. Mayer; Steven R. Biren

[57] ABSTRACT

A device for producing or amplifying coherent radiation includes a semiconductor device such as a laser. By means of electrons of high energy produced by a semiconductor cathode of the device, population inversion is obtained in an active layer of the laser structure. In this manner, laser action is obtained, which offers advantages, especially with II-VI materials which emit radiation of a wavelength shorter than the usual III-V materials, and which do not permit the desired population inversion to be obtained in the same manner as in III-V materials, by means of current injection across a pn junction. The semiconductor cathode and the laser structure can be arranged in mutual separation in a vacuum tube or be realized in one semiconductor body. The short-wave laser is especially advantageous for CD,DOR and VLP applications.

10 Claims, 9 Drawing Figures

DEVICE FOR PRODUCING OR AMPLIFYING COHERENT RADIATION

BACKGROUND OF THE INVENTION

The invention relates to a device for producing or amplifying coherent radiation comprising at least a first body provided with at least a first layer of a material suitable for producing or amplifying such a radiation having at least an active region, in which in the operative state population inversion is obtained by means of electron injection.

Such a device can be used as a semiconductor laser, for example, when the first layer is a suitably chosen layer of semiconductor material. The active region is then situated within a resonator, which is constituted, for example, by two parallel cleavage surfaces of a crystal to which the first layer of semiconductor material belongs. The arrangement may also be used, however, as a selective amplifier of coherent radiation, in which event no reflection members are utilized.

The operation of such a laser or travelling-wave amplifier requires that population inversion occurs in the active layer. Population inversion is obtained if a higher energy level is occupied more strongly than a lower energy level. In semiconductor lasers, this inversion is generally produced by means of electric current; in particular semiconductor lasers are generally constructed as injection lasers, whereby the current through a pn junction provides the required injection. The pn junction may then extend between two parts of the active layer or between the active layer and an adjoining passive layer. Use is generally made of doped gallium arsenide (GaAs) as a material for the active layer of such an injection laser. The wave length of the electromagnetic radiation emitted by such a laser is approximately 900 nm.

For various reasons it is desirable to manufacture lasers of small dimensions which emit radiation of a shorter wave length. For example, when storing information in image and sound carriers (VLP, DOR, Compact Disc), the required surface area for one information bit is inversely proportional to the square of the wave length. Consequently, when the wave length is halved, the possibility is obtained of quadrupling the information density. An additional advantage is that at shorter wave lengths simpler optics may be used.

In order to be able to manufacture semiconductor lasers having a shorter wavelength, use could be made of semiconductor materials having a larger forbidden band-gap than that of gallium arsenide. Materials having a larger forbidden band gap are, for example, zinc oxide (ZnO), cadmium zinc sulphide (CdZnS), zinc sulphide (ZnS) and cadmium zinc selenide (CdZnSe).

A device of the kind mentioned in the opening paragraph is known from the article "Temperature-Induced Wavelength Shift of Electron Beam Pumped Lasers from CdSe, CdS and ZnO" by I. M. Hvam, published in Physical Review B, Volume 4, No. 12, p. 4459–4464 Dec. 15$^{th}$ 1971). In this article, a measuring arrangement is shown by which laser properties of II-VI compounds are examined by bombarding them with electrons from an electron gun. In the article, it is demonstrated that, for example, in zinc oxide (ZnO) and cadmium sulphide (CdS) stimulated emission with associated wavelengths of approximately 400 nm and approximately 500 nm, respectively, is obtained.

Therefore, zinc oxide and cadmium sulphide would be very suitable for the manufacture of a semiconductor laser for short wavelengths if it had not proved impossible hitherto to provide in semiconductor bodies manufactured from these materials a pn junction by which, by means of an electric current, injection and population inversion can be obtained in an active layer. The apparatus for experimental use described in the aforementioned article is of course too voluminous and too expensive for incorporation in VLP systems etc.

SUMMARY OF THE INVENTION

The present invention has for its object to provide a device of the kind mentioned above in which these problems substantially do not not arise.

It has further for its object to provide a laser or travelling-wave amplifier which may be operative at room temperature in the blue or ultraviolet portion of the spectrum.

Also for such devices which operate with longwave electromagnetic radiation of longer wavelength, a device according to the invention can be used.

A device according to the invention is characterized in that it is provided with a semiconductor device comprising at least a semiconductor cathode for producing an electron beam.

The invention is based on the recognition of the fact that by means of a semiconductor cathode an electron current of high current density can be injected in a simple manner into the active layer.

The device according to the invention has various advantages. In the first place, lasers or travellingwave amplifiers can be manufactured therewith, which emit at room temperature electromagnetic radiation of very short wave length (approximately 400-500 nm), which has the aforementioned advantages of increased information density and simpler optics in apparatus for image-, sound and information recording (VLP, Compact Disc, DOR).

Moreover, such a device can be constructed so as to be very small, for example, as a solid state device or as a very small vacuum tube having a semiconductor cathode, in which the first body with the active layer is arranged at the area of the target. In a given embodiment of the semiconductor cathode, such a vacuum tube can be very small, inter alia due to the fact that a "virtual" focus can be chosen effectively for the electron source constituting the semiconductor cathode. This is explained more fully in Dutch Patent Application No. 7905470 corresponding to U.S. Pat. No. 4,303,930, in which also the other advantages of such a cathode have been described,such as in particular the uniform distribution of speed of the electrons, the simple electron optics of the tube and, as compared with thermionic cathodes, the short switching time. Such a vacuum tube is of course much smaller than an electron gun generally used for the experiments described.

Although for the active layer various materials can be chosen, such as, for example, semiconducting III-V compounds, the said first layer preferably comprises a monocrystalline semiconductor body of a II-VI compound. These compounds generally have a larger forbidden band gap and therefore lead to radiation of a shorter wavelength.

The term III-V compound is to be understood to mean herein a compound of at least one element from the group comprising boron (B), aluminum (Al), gallium (Ga), indium (In) and thallium (Tl) with at least one element from the group comprising nitrogen (N), phosphorus (P), arsenic (As), antimony (Sb) and bismuth (Bi).

The term II-VI compound is to be understood herein to mean a compound from at least one element from the group comprising zinc (Zn), cadmium (Cd) and mercury (Hg) with at least one element from the group comprising oxygen (O), sulphur (S), selenium (Se) and tellurium (Te).

In order to obtain a specific wavelength, these compounds may be doped, if desired, appropriate dopants.

The first body may additionally be provided with different layers of a material suitable for producing or amplifying coherent electromagnetic radiation. The different layers may then consist of different materials so that, if desired, with one device radiation of different wavelengths can be obtained. This may be of importance, for example, for (tele)communication applications, in which a wave of a given wavelength acts as a carrier wave, while a signal is supplied to another wave of a different wavelength by means of modulation of the electron injection, after which the two waves are superimposed.

Further, one first layer of the same material may comprise several active regions, for example, due to the fact that intermediate parts of the active region are made inactive by means of ion implantation or, for example, by etching.

For satisfactory laser operation it is necessary that a significant proportion of the electromagnetic waves produced remain enclosed in the active layer. For this purpose, this layer is situated preferably between two cladding layers of a lower refractive index.

For the semiconductor cathode various kinds of cathodes can be chosen, for example, negative electon affinity cathodes or the cathode as described in Dutch Patent Application No. 7800987, corresponding to U.S. Pat. No. 4,259,678 or, for example, in published British Patent Application Serial No. 2109159, corresponding to U.S. Pat. No. 4,516,146.

However, the semiconductor cathode preferably comprises a semiconductor body having a pn junction between a p-type region and an n-type region which adjoins a surface of the semiconductor body, whereby, when a voltage is applied in the reverse direction across the pn junction in the semiconductor body, electrons are produced by avalanche multiplication, which electrons emanate from the semiconductor body, and the pn junction extends at least locally substantially parallel to the surface and has a lower breakdown voltage than the remaining part of the pn junction, the part having the lower breakdown voltage being separated from the surface by an n-type conducting layer having a thickness and doping such that at the breakdown voltage the depletion zone of the pn junction does not extend as far as the surface, but remains separated therefrom by a surface layer which is sufficiently thin to pass the electrons produced.

Especially by using the combination of such a cathode with the first body in a vacuum tube, the aforementioned advantages are obtained in particular when the semiconductor body of the semiconductor cathode is provided with an insulating layer in which at least one opening is formed, while an acceleration electrode is arranged on the insulating layer along the edge.

BRIEF DESCRIPTION OF THE DRAWINGS

The invention will now be described more fully with reference to several embodiments and the drawing, in which:

FIG. 6 shows diagrammatically a device in accordance with the invention, which is formed in one body; while

Figure 1:
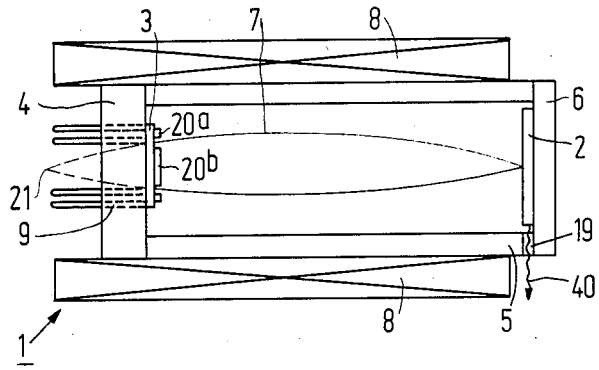
FIG. 1 shows diagrammatically a device in accordance with the invention.

The Figures are drawn schematically and not to scale, while for the sake of clarity in the cross-sections the dimensions in the direction of thickness are greatly exaggerated. Semiconductor zones of the same conductivity type are generally hatched in the same direction. In the Figures, corresponding parts are generally designated by the same reference numerals.

DESCRIPTION OF THE PREFERRED EMBODIMENTS

FIG. 1 shows a device 1 comprising a first body 2 provided with a layer for producing or amplifying coherent electromagnetic radiation. In accordance with the invention, the device 1 further comprises a semiconductor cathode 3, which in this embodiment is mounted on an end wall 4 of a hermetically sealed vacuum tube 5, while the body 2 is located on the other end wall 6 of the vacuum tube 5. The active layer in the first body 2 can be struck by an electron beam 7 produced in the semiconductor cathode 3. The vacuum tube 5 is provided with a coil system 8 for deflecting the beam 7, while for electrical connections the end wall 4 is provided with leadthrough members 9. The semiconductor cathode used and the advantages inherent thereto as well as those of the use of the vacuum tube will be discussed hereinafter.

The first body 2 (see FIGS. 2, 3 and 4a, 4b) on the end wall 6 in this embodiment consists of a supporting body 10 of gallium arsenic phosphide, on which semiconductor structures 11a, 11b are mounted. Such a structure 11 comprises a strip-shaped layer 13 which is situated between two coating layers 14 and 15. Such a laser structure, which emits blue light at room temperature, may be manufactured, for example, with an active layer 13 of zinc selenide (ZnSe) having a thickness between 100 and 300 nm, while the coating layers 14 and 15 consist of zinc selenium sulphide ($ZnSe_xS_{1-x}$) having thicknesses of approximately 100 nm and approximately 50 nm, respectively.

The supporting body of GaAsP comprises gallium, arsenic and phosphorus in such a ratio that a satisfactory grid adaptation is obtained.

The waves produced and amplified in the active layer can oscillate in different modes. The term "longitudinal modes" is used for wave components which propagate in the longitudinal direction of the strip-shaped active region, while for wave components propagating in the direction of thickness the term "transversal modes" is used, and for wave components propagating in the direction of width of the strip-shaped region the term "lateral modes" is used. For many applications it is desirable that the number of possible oscillation modes is limited to a minimum so that preferably the laser amplification is sufficient to maintain the oscillation for only one oscillation mode.

For the transversal and lateral modes a number of measures are known to achieve this. For the transversal modes this is achieved in the present embodiment by a suitable choice of the active layer 13 (100–300 nm) and a suitable variation of the refractive index in the direction of thickness in and near the active region. The zinc selenium sulphide of the coating layers 14, 15 in fact has a larger forbidden band gap and a lower refractive index than the zinc selenide, as a result of which the electrons effectively remain enclosed in the active layer and surface recombination is avoided. Thus, the electromagnetic radiation produced remains effectively enclosed in the active layer. For the lateral modes a limitation to one oscillation mode can also be achieved by a suitable choice of the width of the active region or of the variation of the refractive index in the direction of width of the active region. In the arrangement shown in FIG. 4a, the width of the semiconductor structure and hence of the active region is limited to, for example, 1 to 20 μm.

This structure may be obtained, for example, by first providing the various layers 14, 13, 15 and then patterning the structures 11, for example, by means of etching.

Figure 4B:
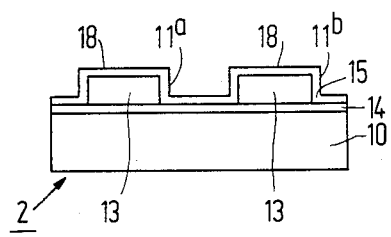

In the arrangement of FIG. 4b the zinc selenium sulphide layer 15 is applied throughout the structure so that the active layers 13 are also enclosed on their sides by this coating layer.

When electrons having an energy of approximately 5 keV strike the surface 18 of the semiconductor 11, they lose approximately 800 eV of energy in the first 50 nm of the layer 15, while the remaining energy is absorbed in the next 150 nm of the structure 11. The electrons thus injected lead to population inversion in the active layer 13 due to the production of electron-hole pairs so that laser action can occur. The vacuum tube 5 is provided with one or more windows 19 through which the electromagnetic radiation 40 can emanate.

The two semiconductor structures 11a, 11b may be of identical construction, the electron beam 7 alternately striking these structures, which may be favorable in connection with the thermal control. The two lasers then operate in pulse mode. However, this is not strictly necessary. Of course a single structure 11 is also sufficient, which then operates, for example, in the continuous wave mode.

The two active layers 13a, 13b may alternatively consist of different materials, the coating layers 14, 15 then being adapted. In this manner, a device is obtained in which, for example, one structure 11a emits a longwave carrier wave, whereas the intensity of short-wave radiation of the second structure 11b is modulated, for example, by means of an electron beam controlled by a second semiconductor cathode. This modulated radiation is then superimposed on the carrier wave by means not shown further in the Figures.

As already stated, especially for short-wave radiation, various II-VI compounds may be used as active material. These compounds may, if required, be doped in order to vary the wavelength of the radiation produced.

A few possible examples are:
  zinc oxide, which at room temperature emits (ultra) violet radiation and may be doped, if required, with, for example, lithium (which results in red light);
  cadmium sulphide, which at room temperature emits green light;
  cadmium selenide, which at room temperature emits red light.

The semiconductor cathode 3 is of the type described in Dutch Patent Application No. 7905470, in which the insulating layer has, for example, two line-shaped openings and the acceleration electrode 20 comprises two subelectrodes 20a, 20b, which also leave free line-shaped emitter regions.

Due to the fact that the cathode 3 emits electrons with a very small spread in the energy, it is particularly suitable to be used in a device according to the invention, in contrast with, for example, thermionic cathodes or semiconductor cathodes in which the depletion zone of the emitting pn junction is exposed at the surface, which semiconductor electrodes emit; electrons with a large spread in the energy. Due to the fact that the electrons are not concentrated first in a so-called "crossover", the energy distribution remains narrow.

By giving the outer subelectrode 20a a higher positive voltage than the inner subelectrode 20b, in this embodiment the electrons 7 leave the cathode along a truncated surface, the electrons effectively emanating from the virtual source 21. Thus, a shorter tube 5 can be used, whereas on the other hand a dynamic focussing is possible by varying the position of the virtual source 21 by means of the voltages at the subelectrodes 20a, 20b, dependent upon the place to be struck.

The fact that the electrons now effectively leave the cathode along a (truncated) surface and as a result move along the surface of the beam, moreover has electron-optical advantages, as has been explained further in the Dutch Patent Application, the contents of which are considered to be incorporated by reference in the present Application.

Figure 5:
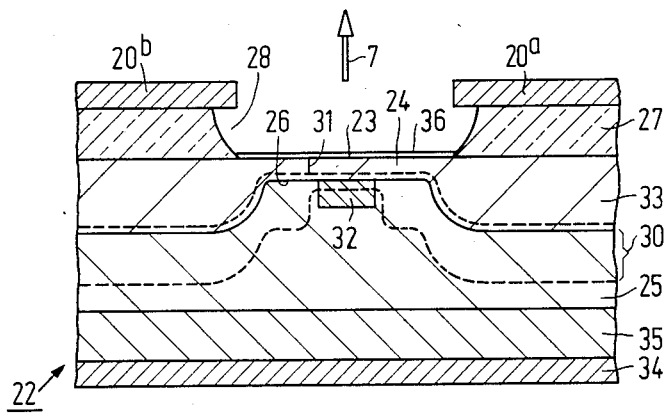
FIG. 5 shows diagrammatically in cross-section a part of a semiconductor cathode as used in the device in FIG. 1.

FIG. 5 shows diagrammatically in cross-section the construction of a part of such a semiconductor cathode having a semiconductor body 22 consisting in this embodiment of silicon. In this embodiment the semiconductor body comprises an n-type region 24 which adjoins a surface 23 of the semiconductor body and forms the pn junction 26 with a p-type region 25. When a voltage is applied in the reverse direction across the pn junction, electrons are generated by avalanche multiplication, which electrons emanate from the semiconductor body. This is indicated by the arrow 7 in FIG. 5.

The surface 23 is provided with an electrically insulating layer 27 of, for example, silicon oxide, in which at least one opening 28 is provided. Within the opening 28 the pn junction 26 extends substantially parallel to the surface 23. Further, an acceleration electrode 20a, 20b, which in this embodiment is made of polycrystalline silicon, is provided on the insulating layer 27 at the edge of the opening 28. The pn junction 26 has within the opening 28 a lower local breakdown voltage than the remaining part of the pn junction. In this embodiment, the local reduction of the breakdown voltage is obtained since within the opening 28 the depletion zone 30 is narrower at the breakdown voltage than at other points of the pn junction 26. The part of the pn junction 26 at reduced breakdown voltage is seperted from the surface 23 by the n-type layer 24. This layer has such a thickness and doping that at the breakdown voltage the depletion zone 30 of the pn junction 26 does not extend as far as the surface 23. As a result, a surface layer 31 remains, which ensures the conduction of the non-emitted part of the avalanche current. The surface layer 31 is sufficiently thin to transmit a proportion of the electrons generated by avalanche multiplication, which electrons emanate from the semiconductor body 22 to form the beam 7.

The part of reduced width of the depletion zone 30 and hence the local reduction of the breakdown voltage of the pn junction 26 is obtained in the present embodiment by providing a more highly doped p-type region 32 within the opening 28, which region forms a pn junction with the n-type region 24.

The semiconductor device is further provided with a connection electrode (not shown), which is connected through a contact hole to the n-type contact zone 33, which is connected to the n-type zone 24. The p-type zone is contacted in this embodiment on the lower side by means of the metallization layer 34. This contacting preferably takes place via a highly doped p-type contact zone 35.

Figure 2:
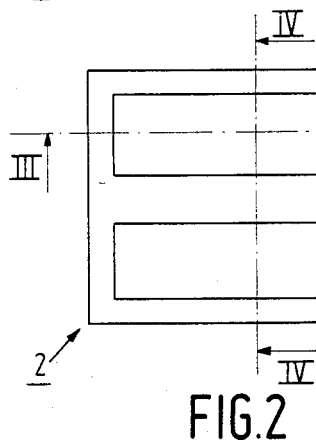
FIG. 2 shows diagrammatically a plan view of a first body as used in the device in FIG. 1.
Figure 4A:
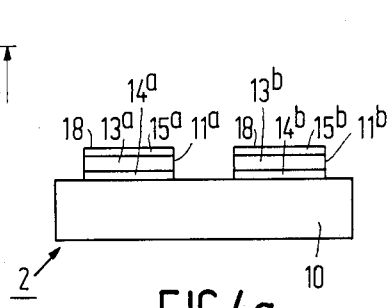
FIGS. 4a, 4b show diagrammatically cross-sections taken on the lines IV—IV in FIG. 2.

In the embodiment shown in FIGS. 1 and 2, the donor concentration in the n-type region 24 is, for example, $5.10^{18}$ atoms/cm$^3$ at the surface, while the acceptor concentration in the p-type region 25 is considerably lower, for example, $10^{15}$ atoms/cm$^3$. The more highly doped p-type region 32 within the opening 28 has at the area of the pn junction an acceptor concentration of, for example, $3.10^{17}$ atoms/cm$^3$. As a result, at the area of this region 32 the depletion zone 30 of the pn junction 26 is reduced in width, which results in a reduced breakdown voltage. As a result, the avalanche multiplication will occur first at this area.

The thickness of the n-type region 24 is in this embodiment 0.02 $\mu$m. At the said donor concentration, a sufficient number of donors can be ionized to reach the field strength (approximately $6.10^5$ V/cm), at which avalanche multiplication will occur, while nevertheless a surface layer 31 remains present, as a result of which on the one hand the conduction to the pn junction 26 can occur, whereas on the other hand this layer is sufficiently thin to pass a proportion of the electrons produced.

The surface 23 may be provided, if desired, with a layer 36 of a material reducing the work potential, such as caesium or barium. For an explanation of the operation and for several methods of manufacturing such a semiconductor cathode reference is invited to the aforementioned Dutch Patent Application No. 7905470.

Figure 6:
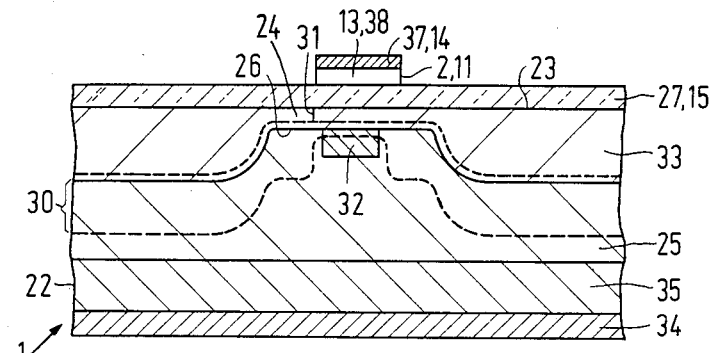

FIG. 6 shows a device 1 in accordance with the invention which is entirely constructed as a solid state device. The semiconductor cathode part 22 is then practically identical to the device shown in FIG. 5 while omitting the acceleration electrode 20 and the layer 36, while, if desired, the insulating layer 27 may have a smaller thickness.

The first body 2, which now does not comprise a supporting body, is directly provided on the layer 27. This may be obtained, for example, by growing the active layer 13 and the coating layers by means of advanced techniques, such a molecular beam epitaxy (MBE) or metallo-organic vapor phase epitaxy (MOVPE).

Figure 3:
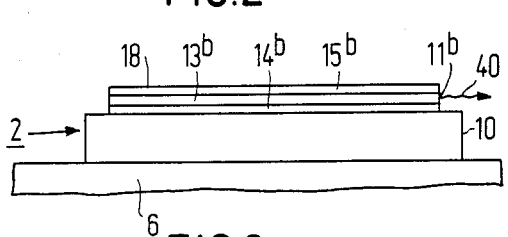
FIG. 3 shows diagrammatically a cross-section taken on the line III—III in FIG. 2.

In this case, the semiconductor structure 11 may again be constructed as a three-layer structure comprising an active layer 13 between two coating layers 14, 15, as in the embodiment shown in FIGS. 2 to 4. In the present invention, however, the active layer 13 is situated directly on the layer 27 of insulating material, whereby this layer 27 and an electrode layer 37 supplying the acceleration voltage act as coating layers 15, 14 or reflecting surfaces. The layer 27,15 consequently forms part on the one hand of the semiconductor cathode 22 and on the other hand of the body 2, which means in this case the semiconductor structure 11. In plan view the electrode 37 and the region 32 in this embodiment have an elongate form with the longitudinal axis at right angles to the plane of the drawing of FIG. 6. As a result, the region in which population inversion occurs is mainly limited to the region denoted by reference numeral 38. The electromagnetic radiation is now emitted in a direction which is substantially at right angles to the plane of the drawing.

Figure 7:
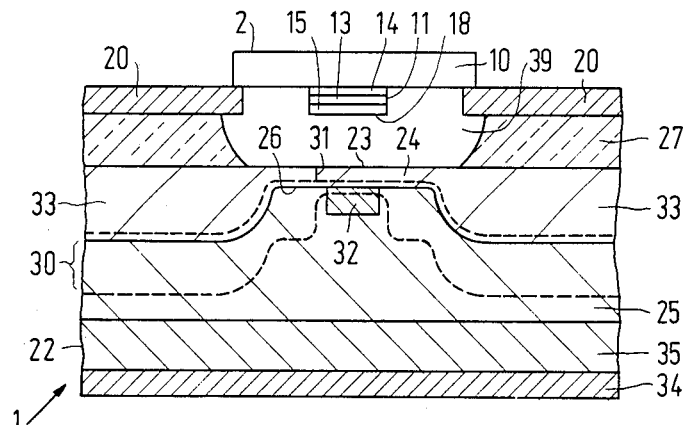
FIG. 7 shows a modification of the device shown in FIG. 6.

A modification of the device of FIG. 6 is shown in FIG. 7. In this case, a semiconductor cathode 22 as shown in FIG. 5 is used with the layer 36 omitted. The body 2,11 comprising an active layer 13 and coating layers 14,15 is now secured directly on the semiconductor cathode 22. This mounting operation is preferably effected in a vacuum so that substantially no residual gases, which can adversely affect the operation of the device, are left in the cavity 39.

In order to provide a window for passing the electromagnetic radiation produced, the electrode 20 may be interrupted, if desired, near an end of the elongate structure 11; the interruption is then filled with radiation-transparent material.

Figure 8:
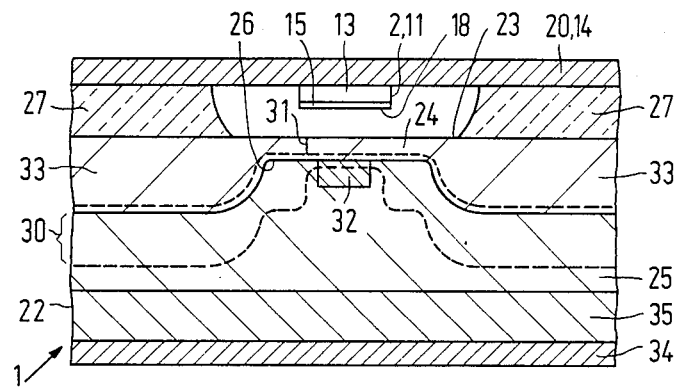
FIG. 8 shows a further modification.

If desired, the acceleration electrode 20 may act as a supporting body, whereby the supporting body 10 can be omitted. The window is then provided in the oxide layer 27 (see FIG. 8). In this embodiment the layer 2014 serves as both the electrode 20 and the upper coating layer 14 for the active layer 13.

The semiconductor structure 11 of FIG. 6 may be coated, if required, with a protecting material. Alternatively, instead of using solely the semiconductor structures 11, bodies 2 similar to those shown in FIGS. 3 and 4 may be used so that the device is further provided with a supporting body 10 which may act, if required, as a heat sink. Otherwise, the reference numerals in FIGS. 6, 7 and 8 have the same meaning as in the other embodiments.

Within the scope of the invention various modifications are possible for those skilled in the art.

For example, by measures known per se in semiconductor technology it may be achieved that the electromagnetic radiation, as also indicated in FIGS. 1 and 3, leaves the semiconductor structure only at one end. Instead of using two strips 11 on one body 2, use may be made, if desired, of two bodies each comprising at least one semiconductor structure. Further, several active regions 13 need not be provided parallel to each other.

The silicon body in which the semiconductor cathode is formed may comprise, if required, besides the semiconductor cathode, other semiconductor elements, such as, for example, transistors for control electronics. Moreover, in the device shown in FIG. 1, measures may be taken to reduce degradation of the semiconductor cathode, as suggested in Dutch Patent Application No. 8104893.

Also with a view to the choice of the materials for the laser structure, this choice is, as already stated, not limited to II-VI compounds, but various other materials may be chosen, such as III-V compounds, and also, for example, chromium-doped ruby.

What is claimed is

1. A device having a coherent electromagnetic radiation output, which comprises:
   a first body having a first layer for generating said electromagnetic radiation output;
   an active region in said first layer, in which, in the operating state, population inversion is obtained by electron injection; and
   a semiconductor device having semiconductor cathode means for generating a beam of electrons in said operating state for injection into said active region, said semiconductor cathode means comprising a semiconductor body having a p-type region and an n-type region which adjoins a surface of the semiconductor body, said p-type and n-type regions forming a p-n junction, whereby, when a voltage is applied in the reverse direction across said p-n junction in the semiconductor body, electrons are produced by avalanche multiplication, which electrons emanate from the semiconductor body, said p-n junction having a portion extending at least locally substantially parallel to the surface and having a lower breakdown voltage at said portion than at the remaining part of said p-n junction, said portion having the lower breakdown voltage being separated from the surface by a portion of said n-type region forming a conducting layer having a thickness and doping concentration such that at the breakdown voltage the depletion zone of the p-n junction does not extend to the surface, but remains separated therefrom by a surface layer which is sufficiently thin to pass said electrons.

2. A device as claimed in claim 1, characterized in that said first layer comprises a mono-crystalline semiconductor body of a II-VI compound.

3. A device as claimed in claim 2, characterized in that said II-VI compound is formed from a compound of at least one of the elements zinc and cadmium with a compound of at least one of the elements oxygen, sulphur, selenium and tellurium.

4. A device as claimed in claim 3, characterized in that said compound is doped to adjust the wavelength of the emitted electromagnetic radiation.

5. A device as claimed in claim 1, 2, 3 or 4, characterized in that said active region in said first layer is strip-shaped.

6. A device as claimed in claim 1, 2, 3 or 4, further comprising two coating layers and characterized in that said active layer is situated between said two coating layers, which have a lower refractive index than that of said active region in said first layer.

7. A device as claimed in claim 1, 2, 3 or 4 characterized in that the surface of said semiconductor body is provided with an insulating layer in which at least one opening is provided, at least one acceleration electrode is provided on the insulating layer along the edge of the opening, and the p-n junction extends at least within the opening substantially parallel to the surface and locally has a lower breakdown voltage.

8. A device as claimed in claim 7, characterized in that the opening in said oxide has the form of a narrow gap.

9. A device as claimed in claim 1, 2, 3 or 4, characterized in that said device further comprises a vacuum tube having, in an evacuated envelope, the first body and the semiconductor cathode, the first body being situated at the area of an end wall opposite the semiconductor cathode.

10. A device as claimed in, claim 1, 2, 3 or 4, characterized in that the first body is provided on the surface of the semiconductor cathode.

* * * * *